United States Patent
Ashour et al.

(10) Patent No.: US 7,650,476 B2
(45) Date of Patent: Jan. 19, 2010

(54) SYSTEM, METHOD AND COMPUTER PROGRAM PRODUCT FOR GENERATING A CONSISTENT POINT IN TIME COPY OF DATA

(75) Inventors: Gal Ashour, Yokne'am Ilit (IL); Kenneth Wayne Boyd, Tucson, AZ (US); Michael Factor, Haifa (IL); Shachar Fienblit, Ein Ayala (IL); Olympia Gluck, Haifa (IL); Amiram Hayardeny, Beijing (CN); Eli Malul, Tirat Carmel (IL); Ifat Nuriel, Moshav Bet-Yosef (IL); Noa Privman-Horesh, Zichron Yaakov (IL); Dalit Tzafrir, Haifa (IL); Sam Clark Werner, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 413 days.

(21) Appl. No.: 11/550,621

(22) Filed: Oct. 18, 2006

(65) Prior Publication Data

US 2008/0098187 A1 Apr. 24, 2008

(51) Int. Cl.
G06F 12/00 (2006.01)
G06F 17/30 (2006.01)
(52) U.S. Cl. .................. 711/162; 711/114; 711/143; 707/10; 707/200; 707/201; 707/202; 707/204
(58) Field of Classification Search ............ 711/162, 711/114, 143, 161; 707/10, 200, 201, 202, 707/204
See application file for complete search history.

(56) References Cited

U.S. PATENT DOCUMENTS

| | | | |
|---|---|---|---|
| 6,611,901 B1 | 8/2003 | Micka et al. | |
| 6,957,362 B2 | 10/2005 | Armangau | |
| 2003/0126387 A1 | 7/2003 | Watanabe | |
| 2003/0158869 A1* | 8/2003 | Micka | 707/203 |
| 2004/0039888 A1 | 2/2004 | LeCrone et al. | |
| 2005/0071586 A1 | 3/2005 | Bartfai et al. | |
| 2005/0071708 A1 | 3/2005 | Bartfai et al. | |

* cited by examiner

*Primary Examiner*—Christian P Chace
*Assistant Examiner*—Mehdi Namazi

(57) ABSTRACT

A method for generating a consistent point in time copy of data, the method includes: selecting at least one selected data block to be copied from a source volume to a target volume in response to a request to generate a consistent point in time copy of multiple data blocks; waiting until the source volume is ready to send the at least one selected data block to a remote volume while queuing at least one data block modify request; de-queuing the at least one queued modify requests while copying the at least one selected data block from the source volume to the target volume; wherein the copying includes utilizing a first copying mechanism to copy a first selected data block if a request to modify the first selected block is de-queued before the first selected data block is copied to the target volume; else, the copying includes using a second copying mechanism that is slower than the first copying mechanism.

23 Claims, 5 Drawing Sheets

SYSTEM, METHOD AND COMPUTER PROGRAM PRODUCT FOR GENERATING A CONSISTENT POINT IN TIME COPY OF DATA

FIELD OF THE INVENTION

The present invention relates to methods, systems and computer program products for generating a consistent point in time copy of data.

BACKGROUND OF THE INVENTION

The importance of data has increased during the last decade while the cost of data storage medium has decreased, thus motivating data storage vendors to provide data protection schemes that are based upon duplication of data.

One of these protection schemes is known as mirroring. Mirroring involves repetitively generating one or more duplicates of data. A real mirror relationship can be established between one production (or primary) site and one or more remote (or secondary) sites. In a multiple remote site environment data from a single production site is mirrored on multiple remote sites.

The following patent and patent application, all being incorporated herein by reference provide various example of some state of the art data protection schemes: U.S. Pat. No. 6,957,362 of Armangau, U.S. patent application publication serial number 2005/0071708 of Bartfai et al. and U.S. patent application publication serial number 2003/0126387 of Watanabe.

There is a need to provide efficient methods, systems and computer program products for generating a consistent point in time copy of data.

SUMMARY OF THE PRESENT INVENTION

In accordance with one aspect of the present invention a method for generating a consistent point in time copy of data is provided. The method includes: selecting at least one selected data block to be copied from a source volume to a target volume in response to a request to generate a consistent point in time copy of multiple data blocks; waiting until the source volume is ready to send the at least one selected data block to a remote volume while queuing at least one data block modify request; de-queuing the at least one queued modify requests while copying the at least one selected data block from the source volume to the target volume; wherein the copying includes utilizing a first (fast) copying mechanism to copy a first selected data block if a request to modify the first selected block is de-queued before the first selected data block is copied to the target volume; else, the copying includes using a second copying mechanism that is slower than the first copying mechanism.

In accordance with one embodiment of the present invention the first copying mechanism is a synchronous copying mechanism.

In accordance with another embodiment of the present invention the second copying mechanism is an asynchronous copying mechanism.

In accordance with yet another embodiment of the present invention selecting includes selecting data blocks stored at multiple source volumes and wherein the waiting comprises waiting until each of the multiple source volumes are ready.

In accordance with one embodiment of the present invention selecting is responsive to a content of a monitoring data structure that indicates which data blocks should be copied.

In accordance with another embodiment of the present invention selecting comprises selecting data blocks that were modified but not transferred to a target volume.

According to a second aspect of the present invention, a computer program product comprising a computer usable medium including a computer readable program is provided. The computer readable program when executed on a computer causes the computer to: select at least one selected data block to be copied from a source volume to a target volume in response to a request to generate a consistent point in time copy of multiple data blocks; wait until the source volume is ready to send the at least one selected data block to a remote volume while queuing at least one data block modify request; and de-queue the at least one queued modify requests while copying the at least one selected data block from the source volume to the target volume; wherein the copying comprises utilizing a first copying mechanism to copy a first selected data block if a request to modify the first selected block is de-queued before the first selected data block is copied to the target volume; else, the copying comprises using a second copying mechanism that is slower than the first copying mechanism.

According to a third aspect of the present invention a system for generating a consistent point in time copy of data is provided. The system includes at least one target volume and a controller, wherein the controller is adapted to: select at least one selected data block to be copied from a source volume to a target volume in response to a request to generate a consistent point in time copy of multiple data blocks; wait until the source volume is ready to send the at least one selected data block to a remote volume while queuing at least one data block modify request; and de-queue the at least one queued modify requests while copying the at least one selected data block from the source volume to the target volume; wherein the controller is adapted to utilize a first copying mechanism to copy a first selected data block if a request to modify the first selected block is de-queued before the first selected data block is copied to the target volume; else, utilize a second copying mechanism that is slower than the first copying mechanism.

According to a fourth aspect of the present invention a method for providing a service to a user is provided. The method includes receiving, over a network, a request to generate a consistent point in time copy of multiple data blocks; selecting at least one selected data block to be copied from a source volume to a target volume in response to the request; waiting until the source volume is ready to send the at least one selected data block to a remote volume while queuing at least one data block modify request; and de-queuing the at least one queued modify requests while copying the at least one selected data block from the source volume to the target volume; wherein the copying comprises utilizing a first copying mechanism to copy a first selected data block if a request to modify the first selected block is de-queued before the first selected data block is copied to the target volume; else, the copying comprises using a second copying mechanism that is slower than the first copying mechanism; and providing, over the network, an indication that a consistent point in time copy of multiple data blocks was generated.

BRIEF DESCRIPTION OF THE DRAWINGS

The present invention will be understood and appreciated more fully from the following detailed description taken in conjunction with the drawings in which.

DETAILED DESCRIPTION OF THE DRAWINGS

In the following description, reference is made to the accompanying drawings which form a part hereof and which illustrate several implementations of the present invention. It is understood that other implementations may be utilized and structural and operational changes may be made without departing from the scope of the present invention.

Methods, systems and computer program products for generating a consistent point in time copy of data. Conveniently, only a source volume and a target volume are required for generating a consistent point in time copy of one or more data blocks originally stored within the source volume.

According to another embodiment of the invention multiple data blocks are transferred from multiple source volumes to multiple target volumes. The multiple source volumes as well as the multiple target volumes can be located in one or multiple systems, machines or devices. A volume is a storage unit that can be a disk, but this is not necessarily so. A volume can refer to a physical storage unit or to a logical partition of one or more storage units.

According to an embodiment of the invention the various remote sites and even primary sites include storage units that are included within a multiple storage unit system, such as but not limited to the TotalStorage Enterprise Storage Server® (ESS) of IBM (Enterprise Storage Server is a registered trademark of International Business Machines, Corp. or "IBM").

Figure 1:
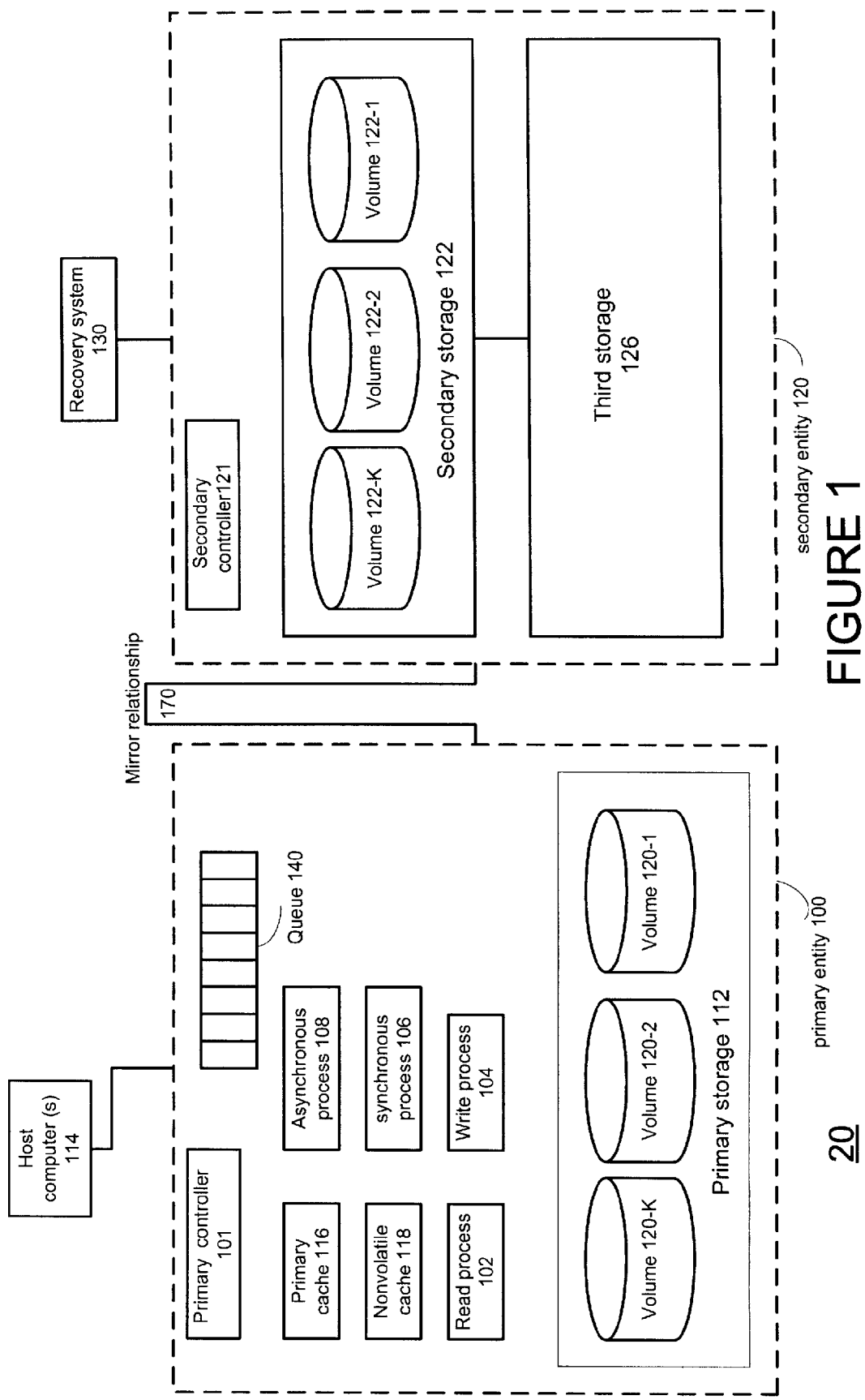
FIG. 1 illustrates an environment, according to an embodiment of the invention.

FIG. 1 illustrates a computing environment 20 in accordance with certain embodiments of the invention.

A primary entity 100 provides one or more host computers 114 access to primary storage 112, such as Direct Access Storage Device (DASD).

The host computers can access primary entity 100 via one or more networks. The one or more host computers 114 can be access by users, via one or more networks.

The primary entity 100 can be a primary site, can include one or more devices, and the like. The primary entity 100 is controlled by primary controller 101. The primary entity 100 can queue data related commands (such as host I/O commands, read commands, stage commands, de-stage commands, write command and the like) requests in one or more queue, illustrated by queue 140. The data related commands can include requests to modify at least one data block, or at least one data sub-block.

It is noted that the term "command" includes a request or any control signal that can initiate a data related process.

It is noted that the primary entity 100 can maintain one or more queues and that a queue can be allocated per host, per storage controller, per type of command, per volume and per a combination thereof.

It is noted that the amount of controllers (such as primary controllers 101) can differ than one, and that various distributed and/or centralized control schemes can be implemented.

The primary storage 112 may be divided into volumes 112-1-112-K collectively denoted 120. The primary storage 112 stores data blocks. Each volume can include multiple storage blocks 112-1, 1-112-K,J (whereas K and J are positive integers) and each storage block 112-k,j (wherein index k ranges between 1 and K and index j ranges between 1 and J) can be further divided into storage sub-blocks. A storage block can store a data block while a storage sub-block can store a data sub-block. Conveniently, data blocks are contents of tracks, while the data sub-blocks are contents of sectors of tracks. For ease of reference, the terms tracks and sectors will be used herein as examples of data blocks and data sub-blocks, but use of these terms is not meant to limit the technique of the invention to tracks and sectors. The techniques of the invention are applicable to any type of storage, storage block or data block divided in any manner.

It is noted that the volumes can be characterized by the same size and the same data partition but this is not necessarily so.

The primary entity 100 includes a primary cache 116 in which updates to tracks in the primary storage 112 are maintained until written to primary storage 112 (i.e., the tracks are destaged). Additionally, the primary entity 100 includes a nonvolatile cache 118. The non-volatile cache 118 may be, for example, a battery-backed up volatile memory, to maintain a non-volatile copy of data updates and other information.

The primary entity 100 includes a read process 102 for reading data, and a write process 104 for writing data. The primary entity 100 also includes an asynchronous process 106 for transferring data (using an asynchronous transfer process) from the primary entity 100 to remote storage, such as storage at the secondary entity 120.

The primary entity 100 also includes a synchronous process 108 for transferring data (using a synchronous transfer process) from the primary entity 100 to remote storage, such as storage at the secondary entity 120. Conveniently, the synchronous transfer process is faster that an asynchronous transfer process as it can start before an asynchronous transfer process starts and is usually completed before an equivalent asynchronous transfer process.

It is noted that the synchronous transfer process and the asynchronous transfer process can use the same link, different links, have different priorities and the like. The synchronous process should be fast enough to prevent long delays in the processing of data related commands that should be preceded by a synchronous transfer of one or more data blocks between the primary entity 100 and the secondary entity 120. It is further noted that a link can include one or more components, one or more networks, and the like.

Secondary entity 120 provides one or more recovery systems 130 access to disk storage, such as secondary storage 122, which maintains back-up copies of all or a subset of the volumes of the primary storage 112. Secondary storage may be a Direct Access Storage Device (DASD).

The secondary storage 122 may be divided into volumes 122-1-122-K collectively denoted 122 containing data blocks. Each volume can include multiple storage blocks 122-1, 1-122-K,J (not shown in FIG. 1) and each storage block 122-k,j can be further divided into storage sub-blocks. A storage block can store a data block while a storage sub-block can store a data sub-block. Conveniently, data blocks are contents of tracks, while the data sub-blocks are contents of sectors of tracks.

The mirroring relationship 170 can include a statically -+ or dynamically changing mapping between volumes of the primary entity and between volumes of the secondary entity. For example, volume 120-k can be mapped to volume 122-k.

The secondary entity 120 may include a third storage 126. The secondary entity 120 may perform an instant virtual copy operation to copy data from the secondary storage 122 to the third storage 126. Instant virtual copy operations work by modifying metadata, such as relationship tables or pointers, to treat a source data object as both the original and copy. In response to a host's copy request, the storage subsystem immediately reports creation of the copy without having made any physical copy of the data. That is, a "virtual" copy has been created. Additionally, in certain implementations, a physical copy may be made. Later, when the storage system receives updates to the original or copy, the updates are stored separately and cross-referenced to the updated data object only.

One such instant virtual copy operation is known as a FlashCopy.RTM. operation. A FlashCopy.RTM. operation involves establishing a logical point-in-time relationship between source and target volumes on the same or different devices. The FlashCopy.RTM. operation maintains a target track on a source disk until the track in a FlashCopy.RTM. relationship has been hardened to its location on the target disk. Further details of FlashCopy.RTM. operations are described in the commonly assigned U.S. Pat. No. 6,611,901 filed on Jul. 2, 1999, entitled "Method, System, and Program for Maintaining Electronic Data as of a Point-in-Time", which patent is incorporated herein by reference in its entirety.

In certain implementations, removable storage (instead of or in addition to remote storage, such as secondary storage 122) may be used to maintain back-up copies of all or a subset of the primary storage 112, and the techniques of the invention transfer data to the removable storage rather than to the remote storage. The removable storage may reside at the primary entity 100.

In certain implementations, the primary entity 100 and secondary entity 120 may include an IBM 3990, Model 6 Storage Controller, Enterprise Storage Server.RTM., or any other control unit known in the art.

In certain implementations, the primary entity 100 and/or secondary entity 120 may include any computing device known in the art, such as a mainframe, server, personal computer, workstation, laptop, handheld computer, telephony device, network appliance, virtualization device, storage controller, etc.

A primary site may include multiple primary control units, primary storage, and host computers. A secondary site may include multiple secondary control units, recovery systems, and secondary storage.

In certain implementations of the invention, data is maintained in volume pairs. A volume pair includes source volume in a primary storage device (e.g., primary storage 112) and a corresponding target volume in a secondary storage device (e.g., secondary storage 122) that includes a consistent copy of the data maintained in the primary volume. These pairs are defined by the mentioned above mapping defined by the mirroring scheme. For example, primary storage 112 may include volume 112-1 and 112-2, and secondary storage 122 may include corresponding volume 122-1 and volume 122-2. A primary storage controller may be provided to control access to the primary storage and a secondary storage controller may be provided to control access to the secondary storage.

In certain implementations, the primary entity 100 and secondary entity 120 communicate via communication paths, such as direct high speed transmission lines (e.g., an Enterprise System Connection (ESCON.RTM.) link. However, the communication paths may include of any other communication means known in the art, including network transmission lines, fiber optic cables, etc.

Using the primary cache 116 of fast memory to store tracks from primary storage 112, the primary entity 100 is able to operate at speeds that are orders of magnitude higher than the speeds available from accessing the primary storage 112 for the tracks. For a read operation, this is possible because input/output (I/O) operations tend to be clustered around the same locations, and it is possible to anticipate which tracks are best to have in primary cache 116. For a write operation, this is possible due to the capability of the primary cache 116 to buffer write operations, and is especially effective in situations of "burst" writes. A burst write refers to writing of a sequence of data counted as one unit in accordance with some specific criterion or measure. A write operation may update data, write new data, or write the same data again.

Initially, host computer 114 writes data to a track in primary cache 116. Write operations modify the track in primary cache 116 synchronously (i.e., writing host computer 114 waits for the operation to complete), and then, in a background process, primary cache 116 content is written to primary storage 112. Writing data in primary cache 116 to primary storage 112 is called a destage operation. With a destage operation, the cached track is not removed from primary cache 116. When a cached track has to be removed from primary cache 116 in order to free space for other data, the cached track is said to be demoted. In most cases, destage occurs prior to demotion. Copying all or a portion of a track from primary storage 112 to primary cache 116 is a staging operation. Creating a track in primary cache 116 is a promotion operation and involves creating a directory entry. A promotion operation can happen without a stage operation. One example would be when a track not previously in primary cache 116 is written to primary cache 116 by a host computer 114. Additionally, data is copied from primary storage 112 to secondary storage 122 asynchronously.

Figure 2:
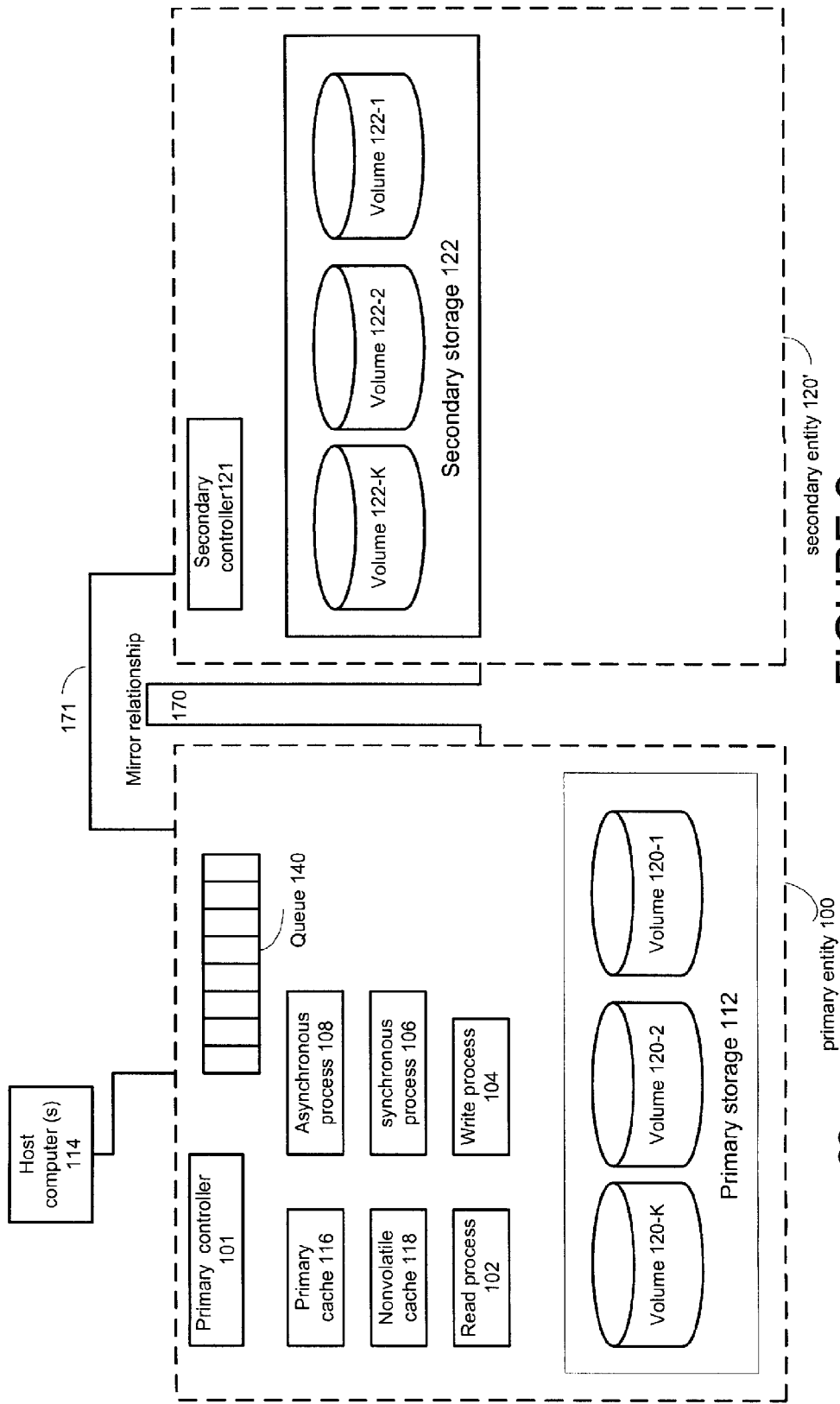
FIG. 2 illustrates another environment, according to another embodiment of the invention.

FIG. 2 illustrates another environment 22, according to another embodiment of the invention.

Environment 22 differs from environment 20 of FIG. 1 by having a secondary entity 120' that does not include third storage unit 126.

Conveniently, a system is provided. The system includes at least one target volume and a controller. The controller is adapted to: select at least one selected data block to be copied from a source volume to a target volume in response to a request to generate a consistent point in time copy of multiple data blocks; wait until the source volume is ready to send the at least one selected data block to a remote volume while queuing at least one data block modify request; de-queue the at least one queued modify requests while copying the at least one selected data block from the source volume to the target volume; wherein the controller is adapted to utilize a first copying mechanism to copy a first selected data block if a request to modify the first selected block is de-queued before the first selected data block is copied to the target volume; else, utilize a second copying mechanism that is slower than the first copying mechanism.

It is noted that this system can include the primary site as well as other components such as the primary site.

Figure 3:
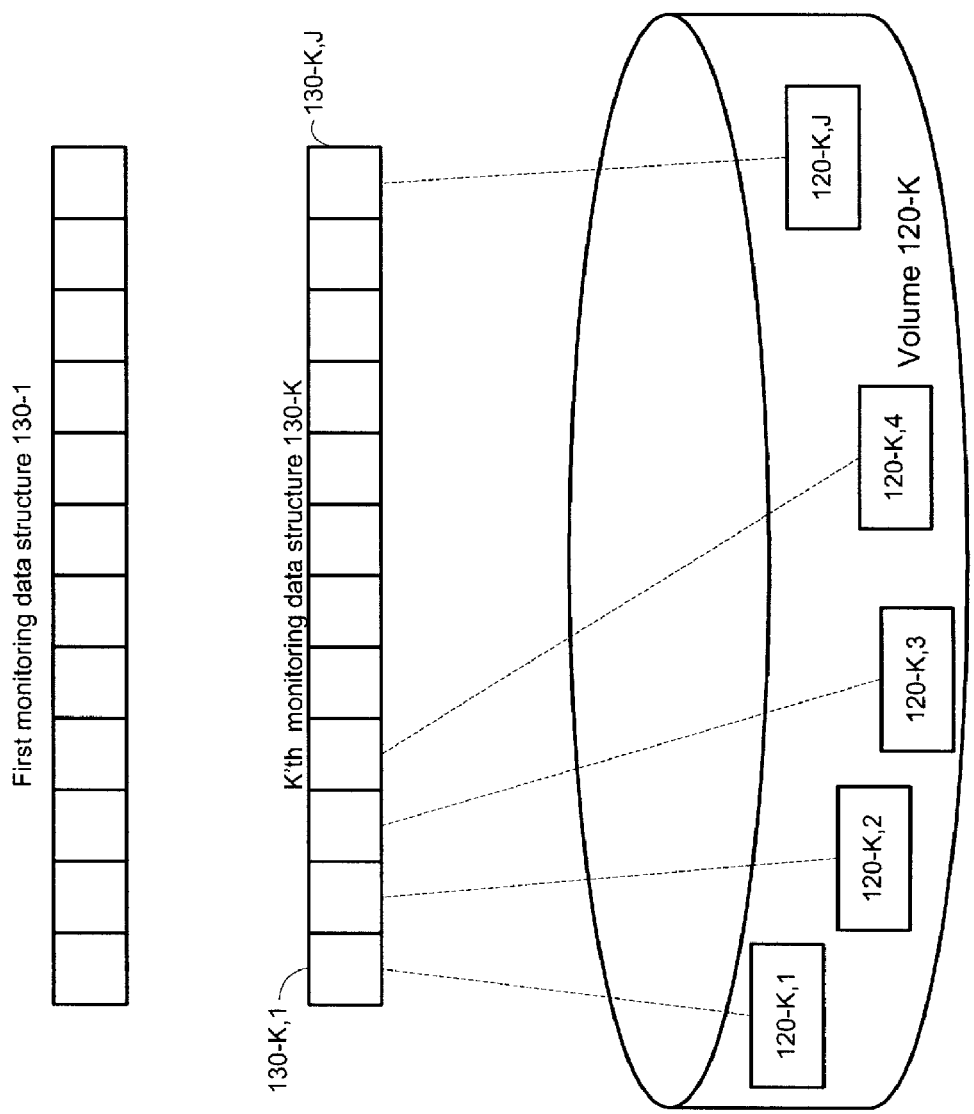
FIG. 3 illustrates a monitoring data structures and a source volume, according to an embodiment of the invention.

FIG. 3 illustrates various monitoring data structures and a certain source volume, according to an embodiment of the invention.

FIG. 3 illustrates an exemplary relationship between monitoring data structure 130-K that includes bits 130-K,1 till 130-K,J and between a source volume 120-K that includes storage blocks such as storage blocks 120-K,1 till 120-K,J.

The monitoring data—structure can be stored in various locations such as within non-volatile cache 118. Although FIG. 3 illustrates a single monitoring data structure it is noted that multiple monitoring data structures such as 130-1-130-K can exist. These data structures are also referred to as out of sync (OOS) structures. These out of sync structures are also referred to as "dirty regions" structures. It is noted that the non-volatile cache 118 can also store additional data structures such as but not limited to a status data structure that indicates the state (for example operational mode) of the primary entity 100.

Conveniently, each volume (120-k) of the primary storage 112 is associated with its own monitoring data structure (130-k) but this is not necessarily so. Conveniently, the bits of a certain monitoring data structure indicate which tracks of a certain volume have been modified since the last transfer to the secondary entity 120, without regard to the particular modified sectors of the track. Conveniently, the bits of a certain monitoring data structure indicate which tracks of a certain volume were not transferred yet to the secondary entity 120.

It is noted that the monitoring data structure can be characterized by a finer granularity (for example a bit per sector, a bit per a set of sectors). The value of each bit in the monitoring data structure indicates whether any portion of the track associated with that bit has been modified since the last time the track was copied to the secondary entity 120.

When this bit (also referred to as indicator) is set to a first value (e.g., one), the setting indicates that the data block is not yet synchronized with the secondary entity 120. When an indicator is set to a second value (e.g., zero), the setting indicates that the data block is synchronized with the secondary entity 120.

In certain implementations, the monitoring data structures reside in volatile cache, such as primary cache 116, with a copy in primary storage 112, and only changes to these data structures are stored in nonvolatile cache 118. In certain implementations, the asynchronous process 106 runs continuously to drain the out of sync structure 210. The term "drain" refers to copying data blocks that have been identified as changed by the indicators in the out of sync structure 210.

Figure 4:
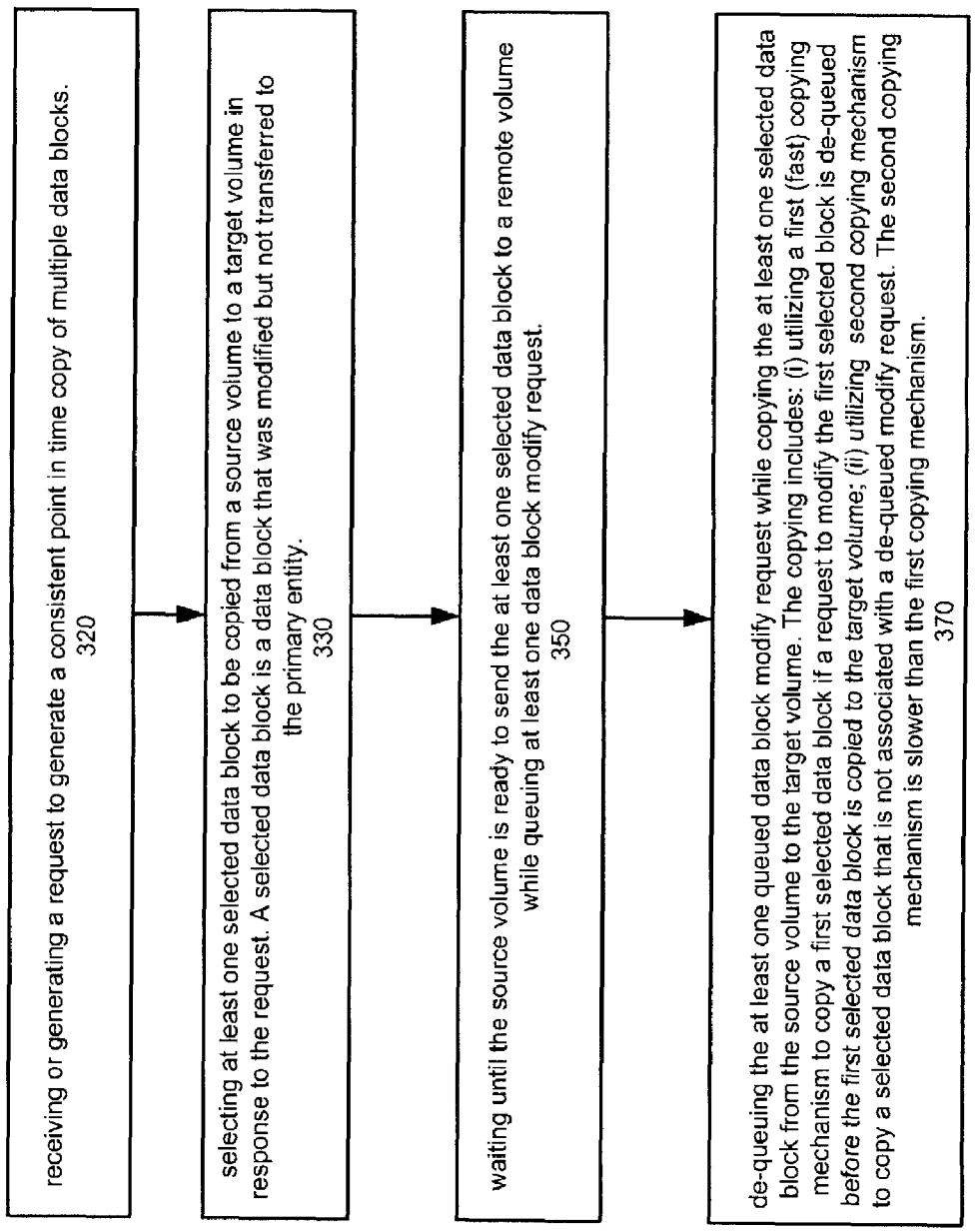
FIG. 4 illustrates a method for generating a consistent point in time copy of data, according to an embodiment of the invention.

FIG. 4 illustrates method 300 for generating a consistent point in time copy of data, according to an embodiment of the invention.

It is noted that method 300 is illustrated in reference to data blocks but it can be applied mutatis mutandis to data sub-blocks.

Method 300 starts by step 320 of receiving or generating a request to generate a consistent point in time copy of multiple data blocks. These multiple data blocks can be stored within one or more volumes of a primary entity such as primary entity 100 of FIG. 1.

It is noted that the request can identify the multiple data blocks and the target volumes, but at least one of these characteristics can also be implied. For example, the request can indicate which are these multiple data blocks while the target volumes are selected in response to: (i) a locations of these multiple data blocks, and (ii) the mapping between source volumes and target volumes.

Step 320 is followed by step 330 of selecting at least one selected data block to be copied from a source volume to a target volume in response to the request. A selected data block is a data block that was modified but not transferred to the primary entity.

Conveniently, step 330 is responsive to a content of one or more monitoring data structures (such as monitoring data structures 130-1-130-K) that indicate which data blocks should be copied.

The transfer of data blocks can be implemented in various manners. The inventors uses an incremental transfer of data blocks in which a data block is transferred from a source volume to a target volume only if the target volume does not store the most updated version of the data block and the data block is part of the consistency point in time copy. It is noted that another incremental transfer can use another granularity such as a data sub-block granularity.

Conveniently, the selecting includes determining which data blocks out of the multiple data blocks should be transferred. These may include selecting data blocks that were modified but not transferred to a target volume.

Step 330 is followed by step 350 of waiting until the source volume is ready to send the at least one selected data block to a remote volume while queuing at least one data block modify request.

If the multiple data blocks are stored in multiple source volumes than step 350 include waiting until all the source volumes are ready.

Step 350 can include sending a request to the source volume and waiting to receive an acknowledgement signal from the source volume. It is noted that the request can be repeated and watchdog techniques can be applied.

Conveniently, the queued one or more data block modify requests originate from one or more host computers.

It is noted that step 350 can include storing data related commands, even data related commands that do not involve modifying a data block. For example both read and write operations can be stored.

Conveniently, the commands are queued until all the source volumes are ready.

Step 350 is followed by step 370 of de-queuing the at least one queued data block modify request while copying the at least one selected data block from the source volume to the target volume. The copying includes: (i) utilizing a first (fast) copying mechanism to copy a first selected data block if a request to modify the first selected block is de-queued before the first selected data block is copied to the target volume; (ii) utilizing second copying mechanism to copy a selected data block that is not associated with a de-queued modify request. The second copying mechanism is slower than the first copying mechanism.

For example, assuming that: (i) monitoring data structure 130-1 indicates that data blocks 120-1, 4, 120-1, 5, 120-1, 7 and 120-1, 8 should be transferred to a target volume, (ii) monitoring data structure 130-3 indicates that data blocks 120-3, 6, 120-3, 9, 120-3, 12 and 120-3, 14 should be transferred to a target volume, (iii) queued commands include a command to modify data block 120-3, 6. (iv) The command to modify data block 120-3, 6 is de-queued before data block 120-3, 6 is transferred to a target volume. Accordingly, under these assumptions that command will be stalled until data block 120-3, 6 is transferred to the target volume using a first copying mechanism.

If, for example, assumptions (i)-(iv) are fulfilled but block data 120-3, 6 was transferred before the commands is de-queued than it was transferred using the slower copy mechanism.

It is noted that the de-queueuing can include executing the de-queued data related commands. As indicated above the execution of a data block modify command can be stalled if that data block should be transferred to a target volume.

Conveniently, the first copying mechanism is a synchronous copying mechanism.

Conveniently, the second copying mechanism is an asynchronous copying mechanism.

Figure 5:
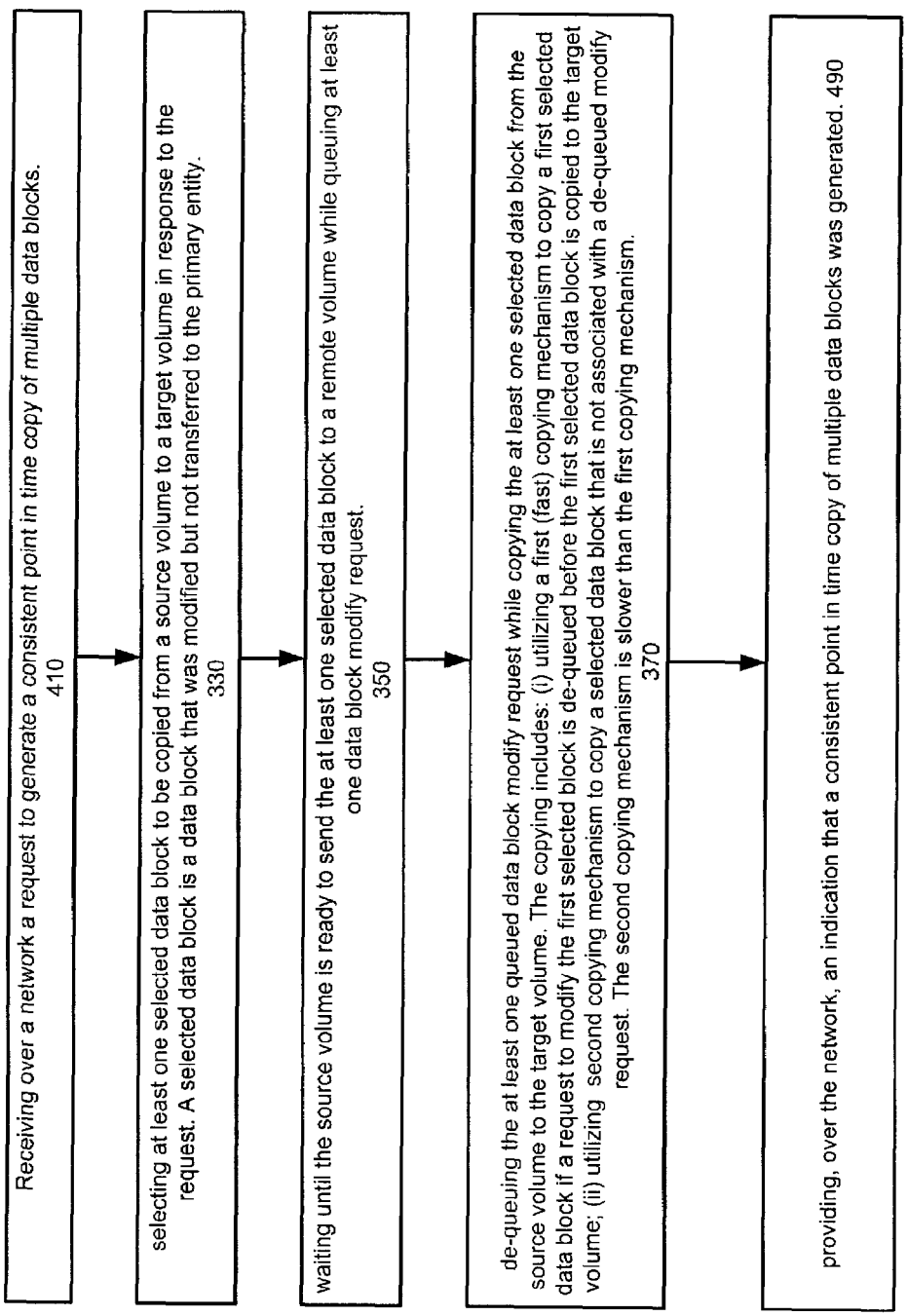
FIG. 5 illustrates a method for providing a service, according to an embodiment of the invention.

FIG. 5 illustrates method 400 for providing a service, according to an embodiment of the invention.

Method 400 starts by stage 410 of receiving, over a network, a request to generate a consistent point in time copy of multiple data blocks.

Stage 410 is followed by stage 330 of selecting, in response to the request, at least one selected data block to be copied from a source volume to a target volume.

Stage 330 is followed by stage 350 of waiting until the source volume is ready to send the at least one selected data block to a remote volume while queuing at least one data block modify request.

Stage 350 is followed by stage 370 of de-queuing the at least one queued modify requests while copying the at least one selected data block from the source volume to the target volume; wherein if a request to modify the first selected block is de-queued before the first selected data block is copied to the target volume then the copying includes utilizing a first copying mechanism to copy a first selected data block; else, the copying includes using a second copying mechanism that is slower than the first copying mechanism.

Stage 370 is followed by stage 490 of providing to the user, over the network, an indication that a consistent point in time copy of multiple data blocks was generated. Conveniently, method 400 can include providing to the user the consistent point in time copy of multiple data blocks. The provision can occur during stage 490 or at a later time, in response to another request to receive the consistent point in time copy of multiple data blocks.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Conveniently, a computer program product is provided. The computer program product includes a computer usable medium that includes a computer readable program, wherein the computer readable program when executed on a computer causes the computer to select at least one selected data block to be copied from a source volume to a target volume in response to a request to generate a consistent point in time copy of multiple data blocks; wait until the source volume is ready to send the at least one selected data block to a remote volume while queuing at least one data block modify request; de-queue the at least one queued modify requests while copying the at least one selected data block from the source volume to the target volume; wherein the copying includes utilizing a first copying mechanism to copy a first selected data block if a request to modify the first selected block is de-queued before the first selected data block is copied to the target volume; else, the copying includes using a second copying mechanism that is slower than the first copying mechanism.

Conveniently, the computer readable program when executed on a computer causes the computer to utilize a synchronous copying mechanism if a request to modify the first selected block is de-queued before the first selected data block is copied to the target volume.

Conveniently, the computer readable program when executed on a computer causes the computer to utilize an asynchronous copying mechanism if the first selected data block is not associated with a queued request to mpdify the first selected data block.

Conveniently, the computer readable program when executed on a computer causes the computer to select data blocks stored at multiple source volumes and to wait until each of the multiple source volumes are ready.

Conveniently, the computer readable program when executed on a computer causes the computer to select in response to a content of a monitoring data structure that indicates which data blocks should be copied.

Conveniently, the computer readable program when executed on a computer causes the computer to select data blocks that were modified but not transferred to a target volume.

Variations, modifications, and other implementations of what is described herein will occur to those of ordinary skill in the art without departing from the spirit and the scope of the invention as claimed.

Accordingly, the invention is to be defined not by the preceding illustrative description but instead by the spirit and scope of the following claims.

We claim:

1. A method for generating a consistent point in time copy of data, the method comprises:
 selecting at least one selected data block to be copied from a source volume at a primary storage site to a remote target volume in response to a request to modify the at least one selected data block;
 waiting until the source volume is ready to send the at least one selected data block to the remote target volume while queuing at least one data block modify request; and
 de-queuing the queued at least one data block modify request while copying the at least one selected data block from the source volume to the target volume,
 wherein the copying comprises utilizing a first copying mechanism to copy the at least one selected data block if the request to modify the at least one selected data block is de-queued before the at least one selected data block is copied to the target volume; else, the copying comprises using a second copying mechanism that is slower than the first copying mechanism.

2. The method according to claim 1 wherein the first copying mechanism is a synchronous copying mechanism.

3. The method according to claim 1 wherein the second copying mechanism is an asynchronous copying mechanism.

4. The method according to claim 1 wherein the selecting is responsive to a content of a monitoring data structure that indicates which data blocks should be copied.

5. The method according to claim 1 wherein the selecting comprises selecting data blocks that were modified but not transferred to a target volume.

6. The method according to claim 1, wherein the primary storage site comprises a plurality of primary storage sites.

7. The method according to claim 6, wherein the remote target volume comprises a plurality of remote target volumes.

8. A computer program product comprising a computer usable storage medium including a computer readable program, wherein the computer readable program when executed on a computer causes the computer to:
 select at least one selected data block to be copied from a source volume at a primary storage site to a remote target volume in response to a request to generate a consistent point in time copy of multiple data blocks;
 wait until the source volume is ready to send the at least one selected data block to the remote target volume while queuing at least one data block modify request wherein the request comprises a request to modify the at least one selected data block; and
 de-queue the queued at least one data block modify request while copying the at least one selected data block from the source volume to the target volume,
 wherein the copying comprises utilizing a first copying mechanism to copy the at least one selected data block if the request to modify the at least one selected data block is de-queued before the at least one selected data block is copied to the target volume; else, the copying comprises using a second copying mechanism that is slower than the first copying mechanism.

9. The computer program product according to claim 8, wherein the computer readable program when executed on a computer causes the computer to utilize a synchronous copying mechanism if a request to modify the first selected block is de-queued before the first selected data block is copied to the target volume.

10. The computer program product according to claim 8, wherein the computer readable program when executed on a computer causes the computer to utilize an asynchronous copying mechanism if the first selected data block is not associated with a queued request to modify the first selected data block.

11. The computer program product according to claim 8, wherein the computer readable program when executed on a computer causes the computer to select in response to a content of a monitoring data structure that indicates which data blocks should be copied.

12. The computer program product according to claim 8, wherein the computer readable program when executed on a computer causes the computer to select data blocks that were modified but not transferred to a target volume.

13. A system for generating a consistent point in time copy of data, the system comprising, at least one target volume and a controller;
 wherein the controller is adapted to:
 select at least one selected data block to be copied from a source volume at a primary storage site to the target volume in response to a request to generate a consistent point in time copy of multiple data blocks;
 wait until the source volume is ready to send at least one selected data block to the remote target volume while queuing at least one data block modify request, wherein the request comprises a request to modify the at least one selected data block; and
 de-queue the queued at least one data block modify request while copying the at least one selected data block from the source volume to the target volume,
 wherein the controller is adapted to utilize a first copying mechanism to copy the at least one selected data block if the request to modify the at least one selected data block is de-queued before the at least one selected data block is copied to the target volume; else, the controller is adapted to utilize a second copying mechanism that is slower than the first copying mechanism.

14. The system according to claim 13 wherein the first copying mechanism is a synchronous copying mechanism.

15. The system according to claim 13 wherein the second copying mechanism is an asynchronous copying mechanism.

16. The system according to claim 13 wherein the controller is adapted to select in response to a content of a monitoring data structure that indicates which data blocks should be copied.

17. The system according to claim 13 wherein the controller is adapted to select data blocks that were modified but not transferred to a target volume.

18. A method for providing a service to a user, the method comprising:
 receiving, over a network, a user request to generate a consistent point in time copy of multiple data blocks;
 selecting at least one selected data block to be copied from a source volume at a primary storage site to a remote target volume in response to the user request;
 waiting until the source volume is ready to send the at least one selected data block to the remote target volume while queuing at least one data block modify request, wherein the user request comprises a request to modify the at least one selected data block; and
 de-queuing the queued at least one data block modify request while copying the at least one selected data block from the source volume to the target volume,
 wherein the copying comprises utilizing a first copying mechanism to copy the at least one selected data block if the request to modify the at least one selected data block is de-queued before the at least one selected data block is copied to the target volume; else, the copying comprises using a second copying mechanism that is slower than the first copying mechanism; and
 providing, over the network, an indication that a consistent point in time copy of the multiple data blocks was generated.

19. The method according to claim 18 further comprising providing, over a network, the consistent point in time copy of the multiple data blocks.

20. The method according to claim 18 wherein the first copying mechanism is a synchronous copying mechanism.

21. The method according to claim 18 wherein the second copying mechanism is an asynchronous copying mechanism.

22. The method according to claim 18 wherein the selecting is responsive to a content of a monitoring data structure that indicates which data blocks should be copied.

23. The method according to claim 18 wherein the selecting comprises selecting data blocks that were modified but not transferred to a target volume.

* * * * *